3,208,305
POWER TRANSMISSION

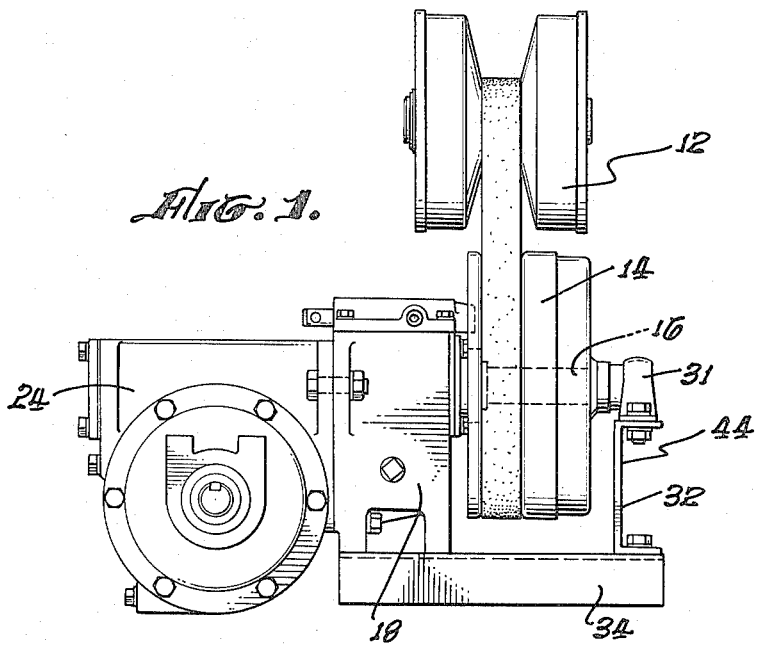

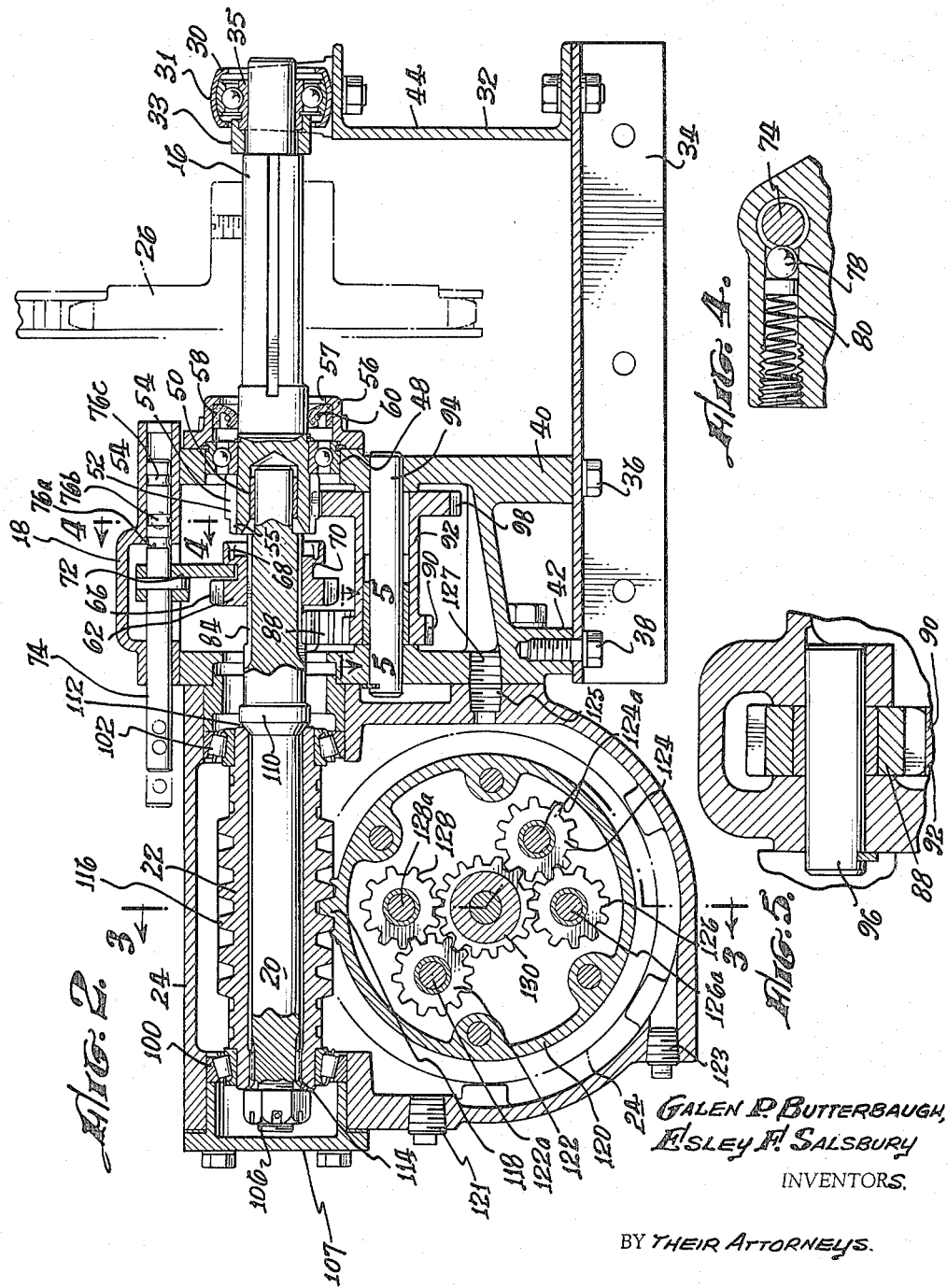

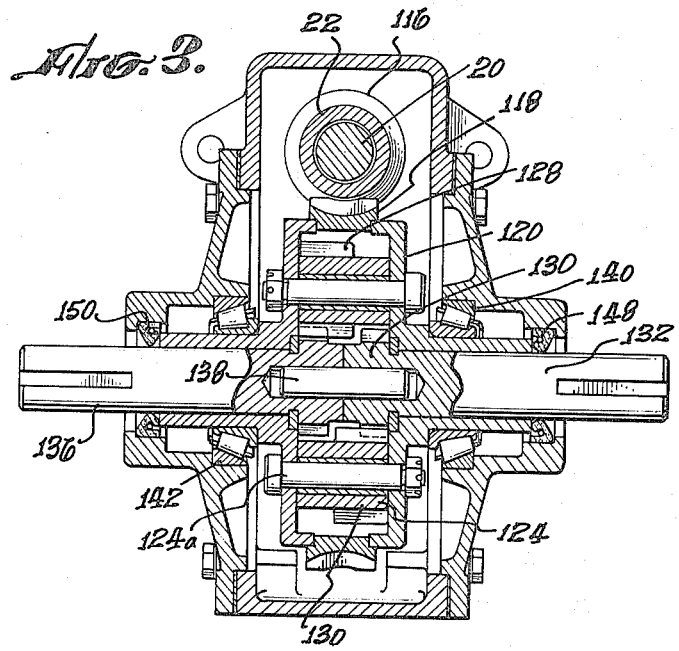

Galen P. Butterbaugh, Lynwood, and Esley F. Salsbury, Los Angeles, Calif., assignors, by mesne assignments, to Clarence E. Fleming, Jr., and Clifford R. Anderson, Jr., both of Pasadena, Calif.
Filed Oct. 2, 1961, Ser. No. 142,337
3 Claims. (Cl. 74—694)

This invention relates to power transmission mechanisms.

The power transmission mechanism of the invention is primarily intended for use on golf carts, personnel carriers, garden tractors, and similar vehicles which are powered by small horsepower gasoline engines, usually in the range of five to ten horsepower. There is a decided need for a dependable transmission mechanism for this type of service. The transmission mechanism of the invention is particularly suitable for transmitting power from the driven pulley of an automatic variable speed torque converter of the general type illustrated and described in U.S. Patent No. 2,543,337, Salsbury, to the drive wheels of a vehicle.

It is an object of the invention to provide a differential of the type having a worm and a worm gear characterized by an improved structure which permits the ready replacement of the input shaft to the worm without disturbing the worm in its relation to the worm gear and to its mounting.

A further object of the invention is to provide a novel design of differential worms and input shaft which forestalls any distortion of the differential input shaft, resulting from overhung load or other reason, from being tranmitted to the worm itself.

In one embodiment of the power transmission mechanism of the invention there is employed a differential and manually shiftable transmission assembly, the differential having a worm associated with a worm gear and the transmission being provided with a shiftable gear that is movable between reverse and forward positions. There is provided a common shaft coupling the differential and power transmission together, which common shaft serves the dual role of output shaft to the transmission and input shaft to the differential. The shiftable gear of the transmission is slidably carried by the common shaft and is movable lengthwise thereof between its reverse and forward positions and the worm of the differential is mounted upon the common shaft within the differential. The common shaft may be removed from the worm and differential housing without disturbing the worm in its relation to the worm gear. The transmission preferably has a transmission input shaft which is in alignment with the common shaft, with the transmission end of the transmission input shaft being provided with a counterbore having a bearing which rotatably supports the transmission end of the common shaft when the transmission is in its reverse position. When the foregoing shiftable gear is moved into the transmission forward position, it serves to lock the common shaft to the transmission input shaft providing a direct drive.

In a preferred embodiment of the mechanism of the invention, the differential worm, which is tubular, is rotatably supported in bearings at its opposite ends within the differential housing. The worm along at least a portion of its length has internal grooves. The differential input shaft which extends through the worm is provided with external splines which seat in the internal grooves of the tubular worm. With this arrangement the differential input shaft may be removed from the worm and from the differential housing without disturbing the worm in its relation to the worm gear. The differential input shaft at one end of the tubular worm has a locking means, preferably a nut on the threaded end of the shaft, which engages that end of the worm to forestall removal of the shaft. The shaft at the other end of the tubular worm has an enlarged portion, preferably with a sloping surface that engages the opposite end of the worm gear. The differential shaft may be removed from the tubular worm by disengaging the locking means and withdrawing the shaft from the opposite end of the worm. In a preferred embodiment of the differential component of the power transmission mechanism of the invention, the splines of the input shaft which seat in the grooves of the internal wall of the tubular worm are immediately adjacent the locking means. The splines of the input shaft normally need not extend more than one-quarter of the length of the portion of the shaft contained within the tubular worm.

These and other advantages and objects of the power transmission of the invention will become more apparent from the following specification and the accompanying drawings which are for the purpose of illustration only, and in which:

FIG. 1 is a side elevational view of a preferred form of the power transmission train of the invention made up of a variable speed drive, with a driven pulley of the drive on an input shaft of a manually shiftable transmission which is coupled to a differential;

FIG. 2 is a longitudinal sectional view of the power transmission train of FIG. 1 with a gear being substituted for the driven pulley of the variable speed drive on the input shaft to the transmission;

FIG. 3 is a cross-sectional view taken along line 3—3 of FIG. 2 through the differential component of the power transmission train of FIG. 2;

FIG. 4 is a fragmentary sectional view taken along line 4—4 of FIG. 2 illustrating a detent mechanism of the manually shiftable transmission component; and FIG. 5 is a fragmentary sectional view taken along line 5—5 of FIG. 2 through one of the gears of the transmission component.

With reference to FIGS. 1 and 2, there is illustrated a power transmission train made up of a variable speed drive 12 with a driven pulley 14 (FIG. 1 only) of the drive 12 mounted on an input shaft 16 of a manually shiftable transmission 18 which is coupled by a common shaft 20 to a tubular worm 22 of a differential 24. The common shaft 20 serves in a dual role as output shaft to the transmission 18 and input shaft to the differential 24. It will be seen that in FIG. 2 a gear 26 has been substituted for the driven pulley 14 of FIG. 1. This illustrates one of the many combinations readily available by interchange of components of the power transmission device of the invention.

In the device illustrated in FIGS. 1 and 2 the outer end of the transmission input shaft 16 is supported by an outboard bearing 30 of a bracket 32 which is bolted to the housing of the transmission 18. The bracket 32 has an inverted L-shape with an elongated base member 34 which is horizontally disposed and held by bolts 36 and 38 respectively to legs 40 and 42 extending downwardly from the underside of the transmission housing. A vertically disposed arm 44 of the bracket 32 is bolted to the outer end of the base member 34 and carries at its upper end the aforementioned outboard bearing 30.

In the particular embodiment illustrated the outboard bearing 30 is of the ball bearing type and is enclosed in a retainer 31 that is bolted to a horizontal extension at the upper end of the vertical arm 44 of the bracket 32. A spacer 33 encircles the shaft 16 and is positioned between the inner race 35 of the outboard bearing 30 and shoulder 37 of the shaft 16.

The inner end of the transmission input shaft 16 is supported within the housing of the transmission by a ball bearing assembly 48. The inner end of the transmission shaft 16 is counterbored to receive a sleeve bearing 50. A gear 52 having two sets of external teeth 54 and 55 is press-fitted to the outer circumference of the transmission shaft adjacent its inner end.

The transmission shaft 16 extends into the interior of the transmission 18 through an oversized hole 57 of a bell shaped enclosure plate 56. A dust seal ring 58 snugly engages the circumerence of the shaft 16 within the enclosure plate 56. The dust seal ring 58 is of the type having a wire spring member 60 which urges the seal proper into close contact with the encircled shaft 16.

The common shaft 20 at its transmission end has a short length of reduced diameter, which portion is rotatably supported by the sleeve bearing 50 contained within the counterbore of the transmission input shaft 16. A shiftable or sliding gear 62 encircles the transmission end of the common shaft 20 (immediately adjacent the transmission input shaft 16) and is movable therealong. The sliding gear 62 at one end has external teeth 66 and at its other end is provided with smaller internal teeth 68.

The sliding gear 62 has three positions, namely reverse, neutral, and forward. The sliding gear 62 centrally of its length has an outwardly facing groove 70 in which a shifting yoke 72 is disposed. The yoke 72 is carried by a shifting rod 74. The shifting rod 74 parallels the shafts 16 and 20 and is supported in an upper portion of the transmission housing. The rod 74 adjacent its inner end is provided with three spaced grooves 76a, 76b, and 76c which co-operate individually with a steel ball 78 (see FIGS. 2 and 4) to hold the shifting rod 74 and yoke 72 in one of the three transmission positions. The ball 78 is urged towards the rod 74 by a coil spring 80. Each of the grooves 76a, 76b, and 76c is relatively shallow, thus permitting movement of the rod 72 with the application of some force.

When the sliding gear 62 is moved to the right of FIG. 2 to the transmission's forward position, its internal teeth 68 mesh with the teeth 55 of gear 52, providing a direct drive between the transmission input shaft 16 and the common shaft 20. It will be appreciated that the sliding gear 62 is slidably held to the common shaft by splines 84. The sliding gear 62 is illustrated in FIG. 2 in its neutral position. When sliding gear 62 is moved to the left of FIG. 2 to the transmission's reverse position, its external teeth 66 engage the teeth of an idler gear 88 which idler gear 88 meshes with teeth 90 of a spool gear 92. The spool gear 92 is carried by a shaft 94 that is spaced below and parallels the two shafts 16 and 20. The idler gear 88 is carried by a stud shaft 96 (FIG. 5) that similarly parallels the two shafts 16 and 20. The opposite end of the spool gear 92 carries teeth 98 which are in mesh with external teeth 54 of the gear 52 which, it will be recalled, is carried by the inner end of the transmission input shaft 16. When the sliding gear 62 is in the transmission's reverse position, power is transmitted via the transmission input shaft 16, the spool gear 92, and the idler gear 88 to the common shaft 20 which is rotated in a direction counter to that of the direct drive of the forward position.

The tubular worm 22 of the differential 24 is supported at its opposite ends within the differential housing by roller bearing assemblies 100 and 102. The common shaft at its differential end is threaded to receive a nut 106. The nut 106 in its threaded-down position abuts one end of the tubular worm 22. Access to the nut 106 is gained by removal of an end plate 107 of the differential housing. The common shaft 20 at the other end of the worm 22 has an enlarged portion 110 which has a sloping surafce 112 that engages the end of the worm. It is thus seen that the common shaft 20 is supported and held in alignment by the sleeve bearing 50 within the counterbore of the inner end of the transmission input shaft 16 and is secured in the worm 22 of the differential 24 by the nut 106 and the enlarged portion 110.

Torque is transmitted to the worm 22 through splines 114 on the differential end of the shaft 20, the splines 114 seating in internal grooves of the inner wall of the tubular worm 22. The splines 114 of the input shaft in the embodiment illustrated extend less than one-quarter of the length of the shaft within the tubular worm 22. Threads 116 of the tubular worm 22 engage with circumferential teeth 118 of a worm gear 120. The worm gear 120 (see FIGS. 2 and 3) carries four planet pinions 122, 124, 126 and 128 which are respectively rotatably held to the worm gear 120 by stub shafts 122a, 124a, 126a, 128a. The two planet pinions 122 and 124 co-operate to drive a sun gear 130 which is affixed to a right-hand axle 132. Similarly, the two planet pinions 126 and 128 co-operate to drive a second sun gear 134 which is affixed to a left-hand axle 136. The two axles 132 and 136 which are in axial alignment, have a common pin 138 seated in adjoining counterbores of their abutting ends. The axles 132 and 136 are respectively supported within the differential housing by roller bearings 140 and 142. Dust seals 148 and 150 respectively encircle the axles 132 and 136.

The design of the components of the power transmission mechanism of the invention permits joining of the components in various combinations. This feature is a decided advantage as it permits the manufacturer to market a number of power transmission trains capable of various duties with a minimum of component parts.

The differential housing is provided with a fill plug 121 and a drain plug 123. Grease may pass between the differential 24 and transmission 18 through aligned holes 125 and 127 in the abutting walls of the two units. The holes 125 and 127 are filled with suitable plugs when the units are used separately.

Although exemplary embodiments of the invention have been disclosed herein for purposes of illustration, it will be understood that various changes, modifications, and substitutions may be incorporated in such embodiments without departing from the spirit of the invention as defined by the claims which follow.

We claim:
1. In a differential of the type having a worm and a worm gear contained in a housing, the improvement comprising:
   a tubular worm rotatably supported in bearings at its opposite ends within the housing, said worm along at least a portion of its length having longitudinally-extending internal grooves;
   a differential input shaft extending through the worm with external splines on the input shaft seating in the internal groopes in the tubular worm, said differential input shaft being removable from the worm and differential without disturbing the worm in its relation to the worm gear; and
   said input shaft at one end of the tubular worm having a locking means engaging said one end of the worm to forestall removal of the shaft, and said shaft at the opposite end of the tubular worm having an enlarged portion that engages said opposite end of the worm, said shaft being removable from said opposite end of the tubular worm upon disengaging said locking means.

2. A differential comprising:
   a housing;

a tubular worm rotatably supported in bearings at its opposite ends within the housing, said form along at least a portion of its length having longitudinally-extending internal grooves;

a differential input shaft extending through the worm with external splines on the input shaft seating in the internal grooves of the tubular worm, said differential input shaft at its outer end being unsupported in a cantilever design; and said input shaft at one end of the tubular worm having a locking means engaging said one end of the worm to forestall removal of the shaft, and said shaft at the opposite end of the tubular worm having an enlarged portion that engages said opposite end of the worm, said shaft being removable from said opposite end of the tubular worm upon disengaging said locking means.

3. A differential in accordance with claim 1 wherein the splines of the input shaft are immediately adjacent the locking means and said splines extend less than one-quarter of the length of the shaft within the tubular worm.

References Cited by the Examiner

UNITED STATES PATENTS

| | | | |
|---|---|---|---|
| 1,175,251 | 3/16 | Fleury et al. | 74—700 |
| 1,207,246 | 12/16 | Vining | 74—700 |
| 1,342,861 | 6/20 | Morton | 74—713 |
| 1,381,197 | 6/21 | John | 74—377 |
| 1,720,064 | 7/29 | Smith | 74—714 |
| 1,770,314 | 7/30 | Lancia | 74—713 |

FOREIGN PATENTS

| | | |
|---|---|---|
| 651,603 | 4/51 | Great Britain. |

DON A. WAITE, *Primary Examiner*.

BROUGHTON G. DURHAM, *Examiner*.